(12) United States Patent
Shutt et al.

(10) Patent No.: US 11,068,278 B2
(45) Date of Patent: Jul. 20, 2021

(54) DUAL INLINE MEMORY MODULE WITH MULTIPLE BOOT PROCESSES BASED ON FIRST AND SECOND ENVIRONMENTAL CONDITIONS

(71) Applicant: DELL PRODUCTS, LP, Round Rock, TX (US)

(72) Inventors: Mark Shutt, Austin, TX (US); Wei G Liu, Austin, TX (US); Quy Hoang, Round Rock, TX (US); Andy Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 16/657,298

(22) Filed: Oct. 18, 2019

(65) Prior Publication Data

US 2021/0117206 A1    Apr. 22, 2021

(51) Int. Cl.
*G06F 9/4401*    (2018.01)
*G06F 3/06*    (2006.01)

(52) U.S. Cl.
CPC .......... *G06F 9/4411* (2013.01); *G06F 3/0607* (2013.01); *G06F 3/0658* (2013.01); *G06F 3/0659* (2013.01); *G06F 3/0671* (2013.01)

(58) Field of Classification Search
CPC .... G06F 9/4411; G06F 3/0607; G06F 3/0658; G06F 3/0659; G06F 3/0671
See application file for complete search history.

(56) References Cited

U.S. PATENT DOCUMENTS

| 7,681,023 B2 * | 3/2010 | Volentine | G06F 13/4234 713/1 |
| 10,534,619 B2 * | 1/2020 | Frey | G06F 9/441 |
| 10,916,326 B1 * | 2/2021 | Holmberg, Jr. | G06F 11/073 |

* cited by examiner

*Primary Examiner* — Tammara R Peyton
(74) *Attorney, Agent, or Firm* — Larson Newman, LLP

(57) ABSTRACT

An information handling system includes a dual in-line memory module (DIMM) coupled to a memory controller via a memory channel. A processor during a first in time boot process of the information handling system determines a first environmental condition of the information handling system, and initializes the memory controller and the DIMM to determine a first set of initialization parameters for the memory controller and the DIMM. During a second in time boot process of the information handling system, the processor determines if a second environmental condition is different than the first environmental condition, if the second environmental condition is not different then to continue the second in time boot process without initializing the memory controller and the DIMM, and if the second environmental condition is different then to initialize the memory controller and the DIMM to determine a second set of initialization parameters for the memory controller and the DIMM.

20 Claims, 3 Drawing Sheets

Figure 1:
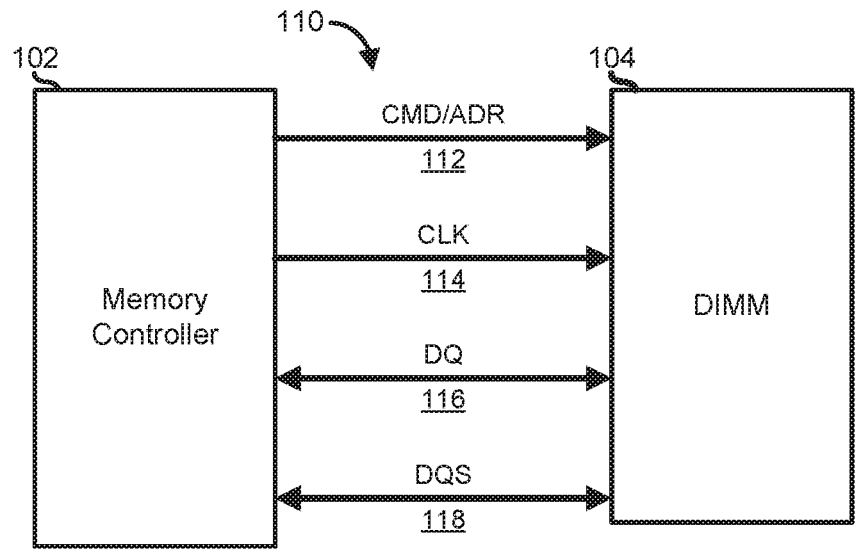
Figure 2:
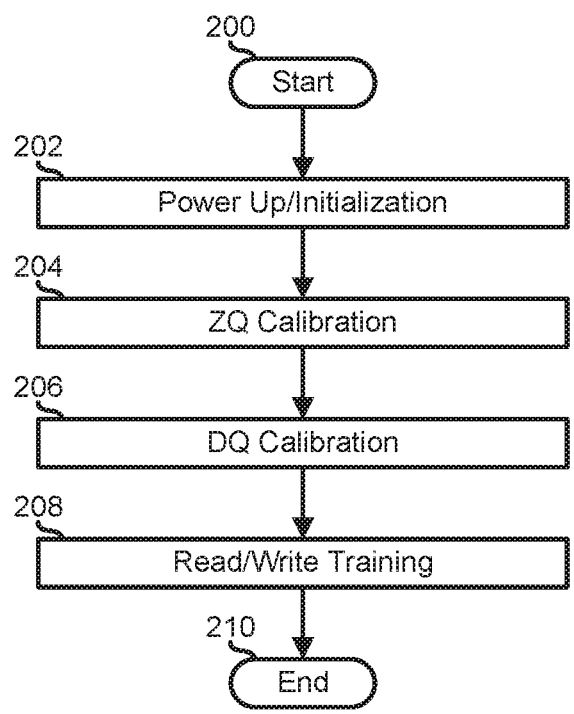

DUAL INLINE MEMORY MODULE WITH MULTIPLE BOOT PROCESSES BASED ON FIRST AND SECOND ENVIRONMENTAL CONDITIONS

FIELD OF THE DISCLOSURE

This disclosure generally relates to information handling systems, and more particularly relates to memory retraining in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A processor during a first in time boot process determines an environmental condition of the information handling system, and initializes a memory controller and a DIMM to determine a first set of initialization parameters for the memory controller and the DIMM. During a second in time boot process of the information handling system, the processor determines if the environmental condition is different than during the first in time boot process, if the environmental condition is not different then to continue the second in time boot process without initializing the memory controller and the DIMM, and if the environmental condition is different then to initialize the memory controller and the DIMM to determine a second set of initialization parameters for the memory controller and the DIMM.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 is a block diagram of an information handling system according to an embodiment of the present disclosure;

FIG. 2 is a flowchart illustrating a method for memory training according to an embodiment of the present disclosure;

FIG. 3 is a flowchart illustrating a method for memory retraining based upon temperature data according to an embodiment of the present disclosure; and FIG. 4 is a block diagram illustrating a generalized information handling system according to an embodiment of the present disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIG. 1 illustrates an information handling system 100 including a memory controller 102, and a dual in-line memory module (DIMM) 104. Memory controller 102 and DIMM 104 are coupled together via a memory channel 110. Hereinafter, memory controller 102, DIMM 104, and memory channel 110 may be referred to as the memory subsystem. Memory controller 102 represents a portion of information handling system 100 that operates to manage the flow of information to the main memory of the information handling system, represented by DIMM 104. Memory controller 102 and DIMM 104 operate in accordance with a particular memory architecture implemented on information handling system 100. For example, memory controller 102 and DIMM 104 may operate in accordance with a Double-Data Rate (DDR) standard, such as a JEDEC DDR4 or DDR5 standard. It will be understood that, where memory controller 102 and DIMM 104 operate in accordance with the DDR5 standard, then the memory controller and DIMM will be configured to provide two separate memory channels similar to memory channel 110.

Memory channel 110 includes a command/address/control bus (CMD/ADR) 112, a clock (CLK) 114 for timing of the signals on the CMD/ADR bus, a data bus (DQ) 116, and a data strobe (DQS) 118 for of the signals on the DQ bus. When information handling system 100 is powered up, for example during a Power-On Self Test (POST) of a system boot process performed by a Basic Input/Output System (BIOS) or Universal Extensible Firmware Interface (UEFI) of the information handling system, the information handling system performs several predefined procedures to ensure that the memory subsystem is configured to provide an optimal level of data transmission reliability and to ensure the highest possible operational bandwidth.

FIG. 2 illustrates the procedures that information handling system 100 performs to initialize the memory subsystem, starting at step 200 where the information handling system is powered up, or otherwise brought out of a reset state. At step 202, information handling system 100 enters a power-up and initialization stage where power is applied to memory controller 102 and to DIMM 104, a RESET signal for a processor of the information handling system is deasserted, a system clock tree is enabled, and mode registers of the DIMM are initialized. At this point, the memory subsystem is configured with a desired operating frequency, and various fixed timing parameters, such as the CAS latency, the CAS write latency, and other parameter, are configured. The details of memory channel initialization are known in the art and will not be further disclosed herein except as needed to illustrate the present embodiments.

At step 204, information handling system 100 enters a "ZQ Calibration" stage where the termination resistors for the data lines of DQ 116 within memory controller 102, and within each Dynamic Random Access Memory (DRAM) device of DIMM 104 are calibrated. Here, due to the nature of the CMOS termination circuits within memory controller 102 and within the DRAM devices of DIMM 104, the termination resistances are sensitive to voltage and temperature changes, and so are designed to be tunable based upon a comparison of the tuned termination resistance to an external high precision reference resistor (not illustrated). During the DQ Calibration stage of step 204, a process is performed to determine an optimum tuning value to apply to the CMOS termination circuits. In particular, one or more parallel resistances within the CMOS termination circuits of each data line are selected to be turned on to tune the termination resistance. Thus the result of the ZQ Calibration stage of step 204 is to determine a number of tuning resistances to be turned on for each data lane in each DRAM on DIMM 104. The number of tuning resistances is programmed into the mode registers of DIMM 104. The details of DQ Calibration are known in the art and will not be further disclosed herein except as needed to illustrate the present embodiments.

At step 206, information handling system 100 enters a "Vref Calibration" stage where a reference voltage for determining whether a data "0" or a data "1" is received by a receiver on the lines of DQ 116. The result of the Vref Calibration stage of step 206 is to determine a reference voltage setting for each DRAM on DIMM 104. The reference voltage settings are programmed into the mode registers of DIMM 104. The details of DQ Calibration are known in the art and will not be further disclosed herein except as needed to illustrate the present embodiments.

At step 208, information handling system 100 enters a "Read/Write Training" stage where various timings are set on the memory subsystem. In particular, CLK 114 and DQS 118 are aligned, read and write delays at DIMM 104 are determined, a data eye for memory reads is centered, and any detected signal integrity errors in memory read operations and memory write operations are reported. Algorithms for Read/Write Training may include write leveling, Multi-Purpose Register (MPR) pattern writes, read centering, write centering, and the like. The settings from the Read/Write Training are programmed into the mode registers of DIMM 104. The details of Read/Write Training are known in the art and will not be further disclosed herein except as needed to illustrate the present embodiments.

The procedures for initializing the memory subsystem are completed in step 210 and information handling system 100 is ready for memory operations. In some cases, periodic recalibration of the memory subsystem is performed. In particular, ZQ calibration and read centering may be performed on a periodic basis, such as every hour, every day, or on the basis of another period of time. Further, recalibration of the memory subsystem can be performed when changes in an operating voltage on information handling system 100, or changes in an operating temperature of one or more of the memory controller, the DIMM, or the memory channel are detected. Note that such periodic recalibration, or recalibration due to the operating conditions of information handling system 100 are performed during run time operation, and are not considered as a part of the system boot process.

In a particular embodiment, when a BIOS/UEFI of information handling system 100 executes an initial boot process on the information handling system, the system boot process operates to initialize the memory subsystem as described above, and to retain the initialization settings in a non-volatile storage area. However, it will be understood that a typical memory subsystem initialization may take a long time to perform, especially where information handling system 100 includes a large number of DIMMs similar to DIMM 104. Moreover, once the BIOS/UEFI has successfully performed memory initialization, it is likely that the derived settings for DQ Calibration, Vref Calibration, and Read/Write training that resulted from the initialization will not be different from one instance of the system boot process to a next instance, unless some operating condition on information handling system 100 has changed. If on subsequent boots of information handling system 100, there are no changes detected in the operating conditions, then, the BIOS/UEFI operates to retrieve the initialization settings from the non-volatile storage area and to apply the retrieved initialization settings to the memory subsystem. In this way, the time needed to initialize the memory subsystem is decreased in the system boot process of the subsequent boots.

On the other hand, on subsequent boots of information handling system 100, when changes in the operating conditions are detected, then the BIOS/UEFI operates perform a new initialization of the memory subsystem. An example of a change in an operating condition on an information handling system may include the addition or removal of a DIMM on a memory channel, the detection of a number of correctable memory errors in a given time exceeding a threshold, or the like. Additionally, if no changes in the operating conditions are detected, then the BIOS/UEFI can perform a new initialization of the memory subsystem on a periodic basis, such as when it has been one week since a last initialization, or a different duration of time, as needed or desired.

Additionally, it has been understood by the inventors of the present disclosure that particular operating conditions of an information handling system that relate to the thermal environment of the information handling system will adversely impact the performance of memory subsystems on the information handling system, and that reinitialization of the memory subsystems in response to the changes in thermal environment of the information handling system will likely lead to a new set of training parameters. Thus, in a particular embodiment, the BIOS/UEFI of information handling system 100 monitors the operating temperature of the information handling system, and triggers a reinitialization of the memory subsystems when the operating temperature of the information handling system is outside a particular temperature window. For example, if a temperature detected in information handling system 100 varies by more than three degrees Celsius (C) (+/−1.5 C), then the BIOS/UEFI can trigger a retraining of the memory subsystem on a subsequent boot of information handling system 100.

The monitored operating temperature may include inputs from various sensors within, or otherwise related to information handling system 100. For example, the monitored temperatures within information handling system 100 may be provided by temperature sensors at various locations within an airflow provided within the information handling system, such as at air inlets, air outlets, or other locations. Other monitored temperatures within information handling system 100 may include temperature information provided by various components of the information handling system, such as CPU temperature information, power supply temperature information, add-in card temperature information, or other temperature information from other components of the information handling system. In particular, where a serial channel provides data communications between two components of the information handling system, such as between a processor and a network interface device such as a network interface card (NIC) or host bus adapter (HBA), a change in the operating temperature of one, the other, or both of the processor and the network interface device may result in degradation of the signals on the memory subsystem when utilizing the original set of training parameters. Here, the BIOS/UEFI of information handling system 100 can respond to the temperature change by reinitializing the memory subsystem during a next boot of the information handling system.

In another embodiment, the BIOS/UEFI of information handling system 100 monitors the hardware configuration within the information handling system, and triggers a reinitialization of the memory subsystem when hardware devices are added to or removed from the information handling system. Here, the addition or removal of various hardware devices may result in a change in airflow within the information handling system, adversely impacting the performance on nearby memory subsystems in information handling system 100.

Figure 3:
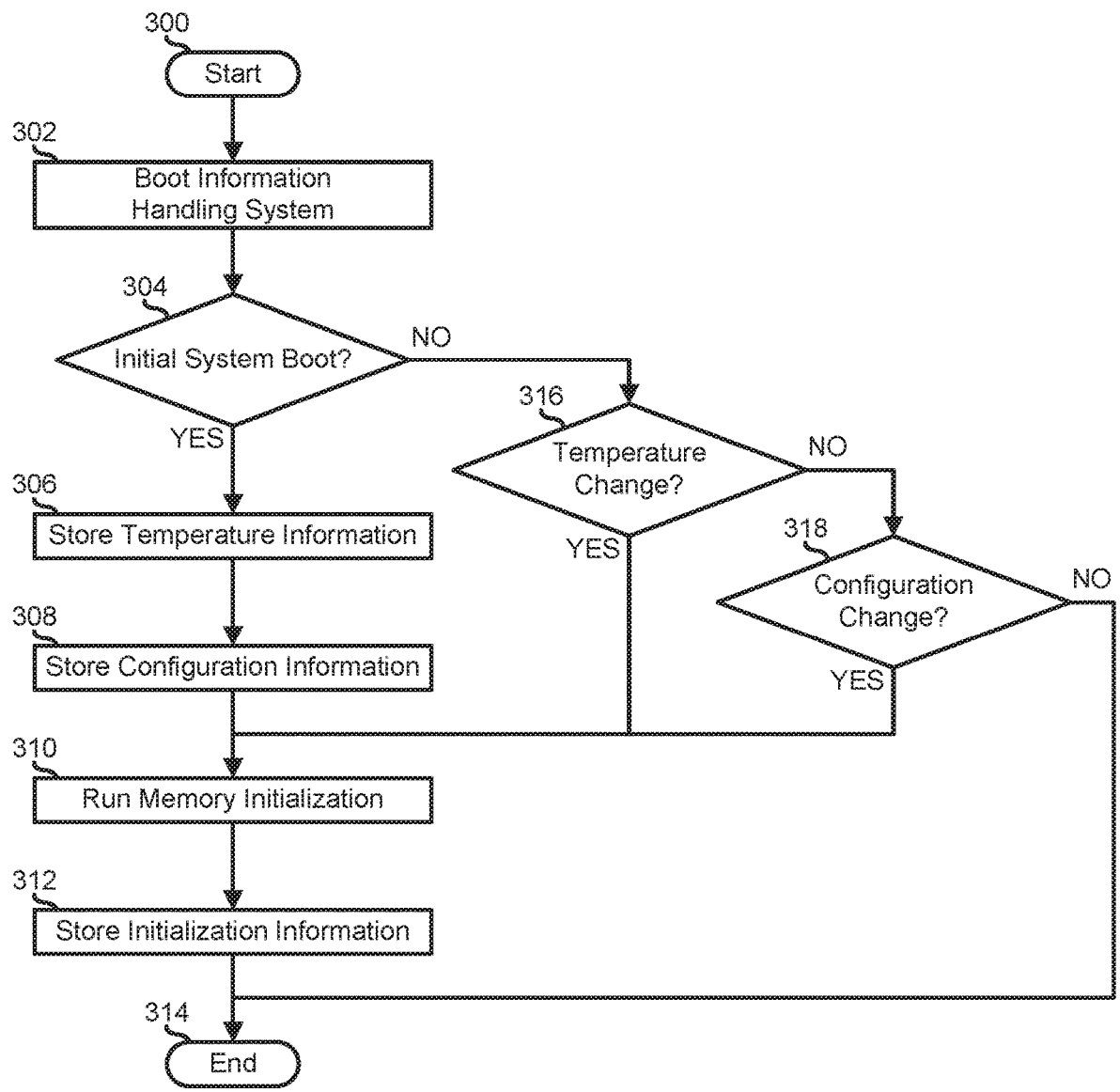

FIG. 3 illustrates a method for memory retraining based upon temperature data, starting at block 300. An information handling system is booted in block 302. A decision is made as to whether or not the information handling system is being booted for a first time in decision block 304. If so, the "YES" branch o decision block 304 is taken, temperature information for the information handling system is gathered and stored to a non-volatile memory (NVRAM) in block 306, and system configuration information for the information handling system is gathered and stored to the NVRAM in block 308. Memory initialization and training is run on a memory subsystem of the information handling system in block 310, the initialization parameters are stored to the NVRAM in block 312, and the method ends in block 314.

Returning to decision block 304, if the information handling system is not being booted for the first time, the "NO" branch is taken and a decision is made as to whether or not the temperature of the information handling system at the current system boot has changed as compared to the temperature of the information handling system at the baseline system boot in decision block 318. If so, the "YES" branch of decision block 316 is taken and the method proceeds to block 310 where the memory initialization and training is run on the memory subsystem of the information handling system. If the temperature of the information handling system at the current system boot has not changed, the "NO" branch of decision block 316 is taken and a decision is made as to whether or not a configuration of the information handling system has changed as compared with the baseline configuration of the information handling system in decision block 318. If so, the "YES" branch of decision block 318 is taken and the method proceeds to block 310 where the memory initialization and training is run on the memory subsystem of the information handling system. If the configuration of the information handling system has not changed, the "NO" branch of decision block 318 is taken and the method ends in block 314.

Figure 4:
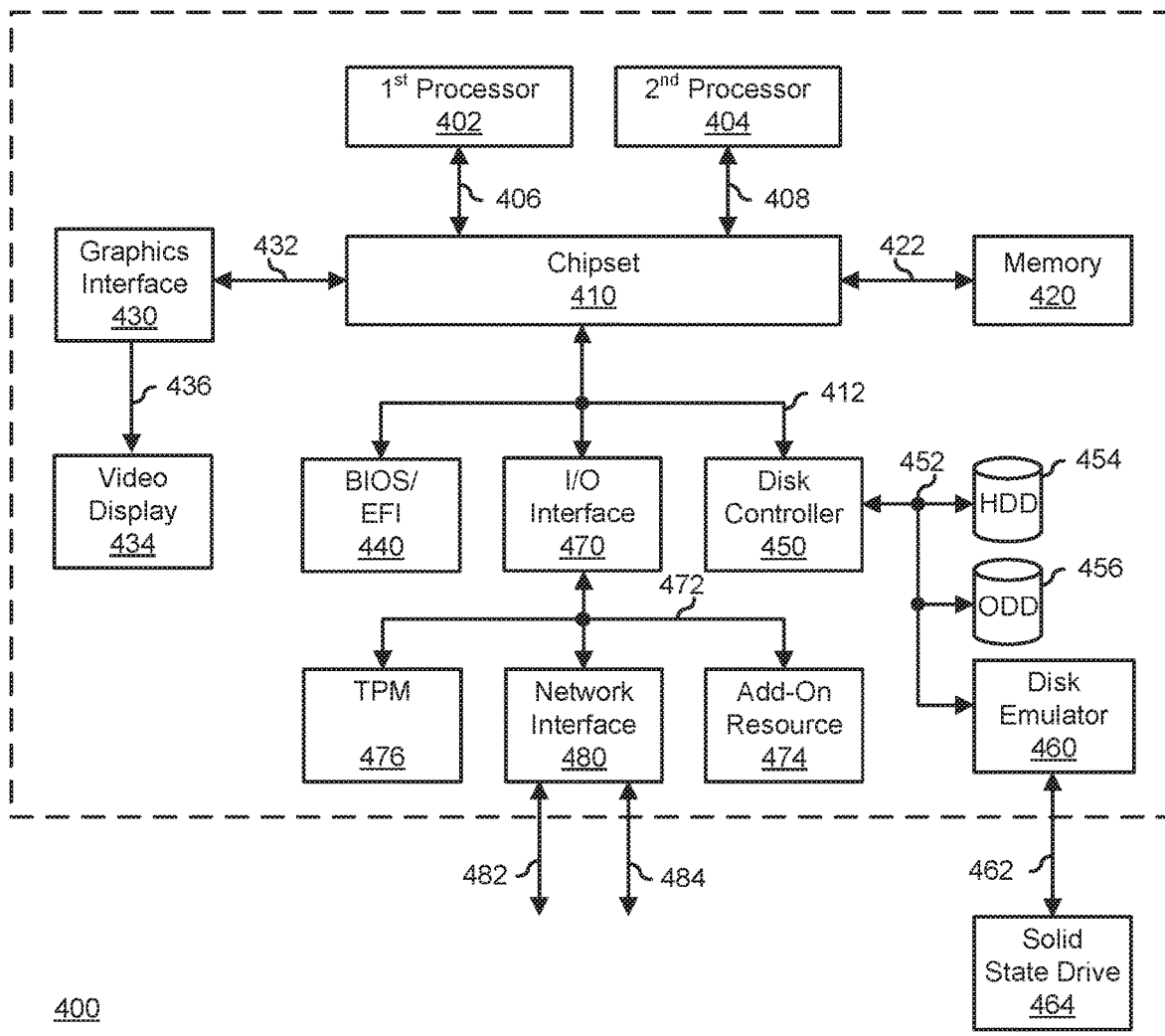

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a memory controller;
    a dual in-line memory module (DIMM) coupled to the memory controller via a memory channel; and
    a processor configured:
        during a first in time boot process of the information handling system, to determine a first environmental condition of the information handling system, and to initialize the memory controller and the DIMM to determine a first set of initialization parameters for the memory controller and the DIMM;
        store the first environmental condition and the first set of initialization parameters in a non-volatile memory; and
        during a second in time boot process of the information handling system, to determine if a second environmental condition is different than the first environmental condition, if the second environmental condition is not different then to continue the second in time boot process initializing the memory controller and the DIMM using the first set of initialization parameters, and if the second environmental condition is different then to initialize the memory controller and the DIMM to determine a second set of initialization parameters for the memory controller and the DIMM.

2. The information handling system of claim 1, wherein the first and second environmental conditions include a temperature within the information handling system.

3. The information handling system of claim 2, wherein the temperature within the information handling system includes a temperature of the DIMM.

4. The information handling system of claim 2, wherein the second environmental condition is determined to be different form the first environmental condition when a temperature difference is more than three degrees C.

5. The information handling system of claim 1, wherein the first and second environmental conditions include a configuration of devices within the information handling system.

6. The information handling system of claim 5, wherein the second environmental condition is determined to be different form the first environmental condition when a first device is installed into the information handling system at a time between the first in time boot process and the second in time boot process.

7. The information handling system of claim 5, wherein the second environmental condition is determined to be different form the first environmental condition when a second device is removed from the information handling system at a time between the first in time boot process and the second in time boot process.

8. The information handling system of claim 1, wherein initializing the memory controller and the DIMM, the processor is further configured to power up the DIMM, to perform a first impedance calibration, to perform a second impedance calibration, and to perform a read/write training.

9. A method, comprising:
determining, by a processor of an information handling system during a first in time boot process of the information handling system, a first environmental condition of the information handling system;
initializing, during the first in time boot process, a first set of initialization parameters for a memory controller of the information handling system and a dual in-line memory module (DIMM) of the information handling system, the DIMM coupled to the memory controller via a memory channel;
storing the first environmental condition and the first set of initialization parameters in a non-volatile memory
determining, by the processor during a second in time boot process of the information handling system, if a second environmental condition is different than the first environmental condition;
when the second environmental condition is not different, continuing, by the processor, the second in time boot process initializing the memory controller and the DIMM using the first set of initialization parameters; and
when the second environmental condition is different, initializing, by the processor, the memory controller and the DIMM to determine a second set of initialization parameters for the memory controller and the DIMM.

10. The method of claim 9, wherein the first and second environmental conditions include a temperature within the information handling system.

11. The method of claim 10, wherein the temperature within the information handling system includes a temperature of the DIMM.

12. The method of claim 10, wherein the second environmental condition is determined to be different form the first environmental condition when a temperature difference is more than three degrees C.

13. The method of claim 9, wherein the first and second environmental conditions include a configuration of devices within the information handling system.

14. The method of claim 13, wherein the second environmental condition is determined to be different form the first environmental condition when a first device is installed into the information handling system at a time between the first in time boot process and the second in time boot process.

15. The method of claim 13, wherein the second environmental condition is determined to be different form the first environmental condition when a second device is removed from the information handling system at a time between the first in time boot process and the second in time boot process.

16. The information handling system of claim 9, wherein initializing the memory controller and the DIMM, the method further comprises:
powering up, by the processor, the DIMM;
performing a first impedance calibration;
performing a second impedance calibration; and
performing a read/write training.

17. An information handling system, comprising:
a double data rate (DDR) dual in-line memory module (DIMM) coupled to a memory controller via a memory channel; and
a processor configured:
during a first in time boot process of the information handling system, to determine a first environmental condition of the information handling system, and to initialize the memory controller and the DDR DIMM to determine a first set of initialization parameters for the memory controller and the DDR DIMM, and
during a second in time boot process of the information handling system, to determine if a second environmental condition is different than the first environmental condition, if the second environmental condition is not different then to continue the second in time boot process initializing the memory controller and the DDR DIMM using the first set of initialization parameters, and if the second environmental condition is different then to initialize the memory controller and the DDR DIMM to determine a second set of initialization parameters for the memory controller and the DDR DIMM.

18. The information handling system of claim 17, wherein the first and second environmental conditions include a temperature of the DDR DIMM.

19. The information handling system of claim 17, wherein the first and second environmental conditions include a configuration of devices within the information handling system.

20. The information handling system of claim 19, wherein the second environmental condition is determined to be different form the first environmental condition when one of a first device is installed into the information handling system at a time between the first in time boot process and the second in time boot process, and a second device is removed from the information handling system at a time between the first in time boot process and the second in time boot process.

* * * * *